United States Patent [19]

Robertson

[11] Patent Number: 4,987,300

[45] Date of Patent: Jan. 22, 1991

[54] OPTICAL-MECHANICAL ROTATION SENSING MECHANISM FOR A WEB-ROLL

[75] Inventor: Jeffrey C. Robertson, Rochester, N.Y.

[73] Assignee: Eastman Kodak Company, Rochester, N.Y.

[21] Appl. No.: 505,961

[22] Filed: Apr. 9, 1990

[51] Int. Cl.$^5$ .............................................. G01D 5/34
[52] U.S. Cl. .................................. 250/231.14; 250/229
[58] Field of Search ............. 250/237 G, 561, 231.13, 250/231.14, 229; 33/736, 763, 773

[56] References Cited

U.S. PATENT DOCUMENTS

| | | | |
|---|---|---|---|
| 1,810,324 | 6/1931 | Owens | 250/229 |
| 3,564,219 | 2/1971 | Mufziger | 235/92 |
| 3,730,453 | 5/1973 | Hotchkiss et al. | 242/191 |
| 3,779,483 | 12/1973 | Inoue | 242/191 |
| 3,857,032 | 12/1974 | Van Englehaven | 250/229 |
| 3,917,142 | 11/1975 | Guarderas | 226/38 |
| 4,153,361 | 5/1979 | Axelrod | 354/275 |
| 4,549,808 | 10/1985 | Ernst | 250/237 G |

Primary Examiner—Edward P. Westin
Attorney, Agent, or Firm—William C. Dixon, III

[57] ABSTRACT

An optical-mechanical rotation sensing mechanism for a web-roll rotatably mounted within a cartridge comprises a flange on the web-roll, activating means on the flange, and an optical sensor, outside the cartridge, including a beam of light for sensing incremental rotation of the flange and web-roll. A movable flag on the cartridge exterior actuates the optical sensor in response to movement of the flag between a first position, in which the light beam is interrupted, and a second position in which the light beam is uninterrupted. A coupling means, including a light-shield hood, couples the flange activating means to the flag for moving the flag between its first and second positions.

8 Claims, 5 Drawing Sheets

4,987,300

OPTICAL-MECHANICAL ROTATION SENSING MECHANISM FOR A WEB-ROLL

BACKGROUND OF THE INVENTION

1. Field of the Invention

The present invention relates generally to photographic cartridges, and more particularly to an optical-mechanical rotation sensing mechanism for a web-roll mounted for rotation within a cartridge.

2. Description of the Prior Art

Sensing mechanisms for sensing web rotation, or web transport, are well known in the prior art, as indicated in U.S. Pat. Nos. 3,564,219, No. 3,730,453, No. 3,779,483, No. 3,917,142, and No. 4,153,361.

Most of those patents utilize some type of sensing mechanism wherein pulses are generated for indicating a rotational velocity of the web spool. The pulses are fed to a counter, where they are accumulated, stored, and displayed to indicate the amount of web material remaining on the spool.

One problem with the prior-art sensing mechanisms is that, mechanically, they are of relatively complicated construction, which adversely affects the reliability and cost of such mechanisms. Another disadvantage of such mechanisms is that the web-roll cartridge normally interfaces with a printer or the like, and the optical-mechanical features of the mechanisms are normally mounted in the interfacing structure and not within the cartridge. That necessitates a larger and more complicated interfacing structure. The optical-mechanical rotation sensing mechanism of this invention is believed to eliminate these and other disadvantages of the known prior art.

SUMMARY OF THE INVENTION

An object of the present invention is to provide an optical-mechanical rotation sensing mechanism for a photosensitive web-roll mounted for rotation within a cartridge. The optical-mechanical rotation sensing mechanism comprises a flange on the web-roll, activating means on the flange, and optical sensing means outside the cartridge, which includes a light source that emits a beam of light and a photodetector positioned in the beam of light at a distance from the light source for sensing incremental rotation of the flange and web-roll. A movable flag is provided on the cartridge exterior for actuating the optical sensing means. The flag actuates the sensing means by movement of the flag between a first position, in which the beam of light is interrupted, and a second position in which the beam of light is uninterrupted. Coupling means is provided coupling the flange activating means to the flag for intermittently moving the flag between its first and second positions.

In another feature of the invention, the flange has a circular lip, and the coupling means comprises a unitary member having a flange lip follower and a flag support portion connected to the flag. The flange lip follower is pivotably movable within the cartridge. The unitary member has an integral torsion spring for biasing the flange lip follower toward the flange lip and the flag toward its second position. The flag support portion and flag extend into and through an opening in a wall of the cartridge. The unitary member further has a light-shield hood for light-shielding the interior of the cartridge from the flag support portion and opening.

In a more specific feature of the invention, the flag support portion comprises a rib with an integral bearing surface and an arm connecting the rib to the flag. The cartridge has a wall having a projecting boss with an opening extending through the boss and wall for receiving the flag and flag arm, and for rotatably supporting the rib bearing surface. The light-shield hood is cup-shaped and encloses the opening and boss. The cup-shaped hood has inner surfaces extending over outer surfaces of the boss for optimum light shielding integrity.

In still another specific feature of the invention, the flange activating means comprises angularly spaced notches in the circular lip, and the flange lip follower is mounted in alignment with the notches. The flange lip follower comprises a ramp having an inclined surface terminating in a shoulder. In the forward direction of rotation of the web-roll for withdrawing web from the cartridge, the ramp rides on the flange and enters each of the notches, and is cammed out of each notch by the trailing edge of the notch riding on the inclined surface of the ramp. In the reverse direction of rotation of the web-roll, the ramp shoulder engages the leading edge of the first notch it encounters for preventing further reverse rotation of the web-roll, thereby functioning as an anti-rewind mechanism.

The invention and its objects and advantages will become more apparent from the detailed description of the preferred embodiment presented below.

BRIEF DESCRIPTION OF THE DRAWINGS

In the detailed description of the preferred embodiment of this invention presented below, reference is made to the accompanying drawings, in which.

DESCRIPTION OF THE PREFERRED EMBODIMENT

Because certain parts of photographic cartridges and interfacing apparatus are well known, the following description is directed in particular to those elements forming, cooperating directly with, or relating to the present invention. Elements not specifically shown or described herein are selectable from those known in the pertinent art.

Figure 1:
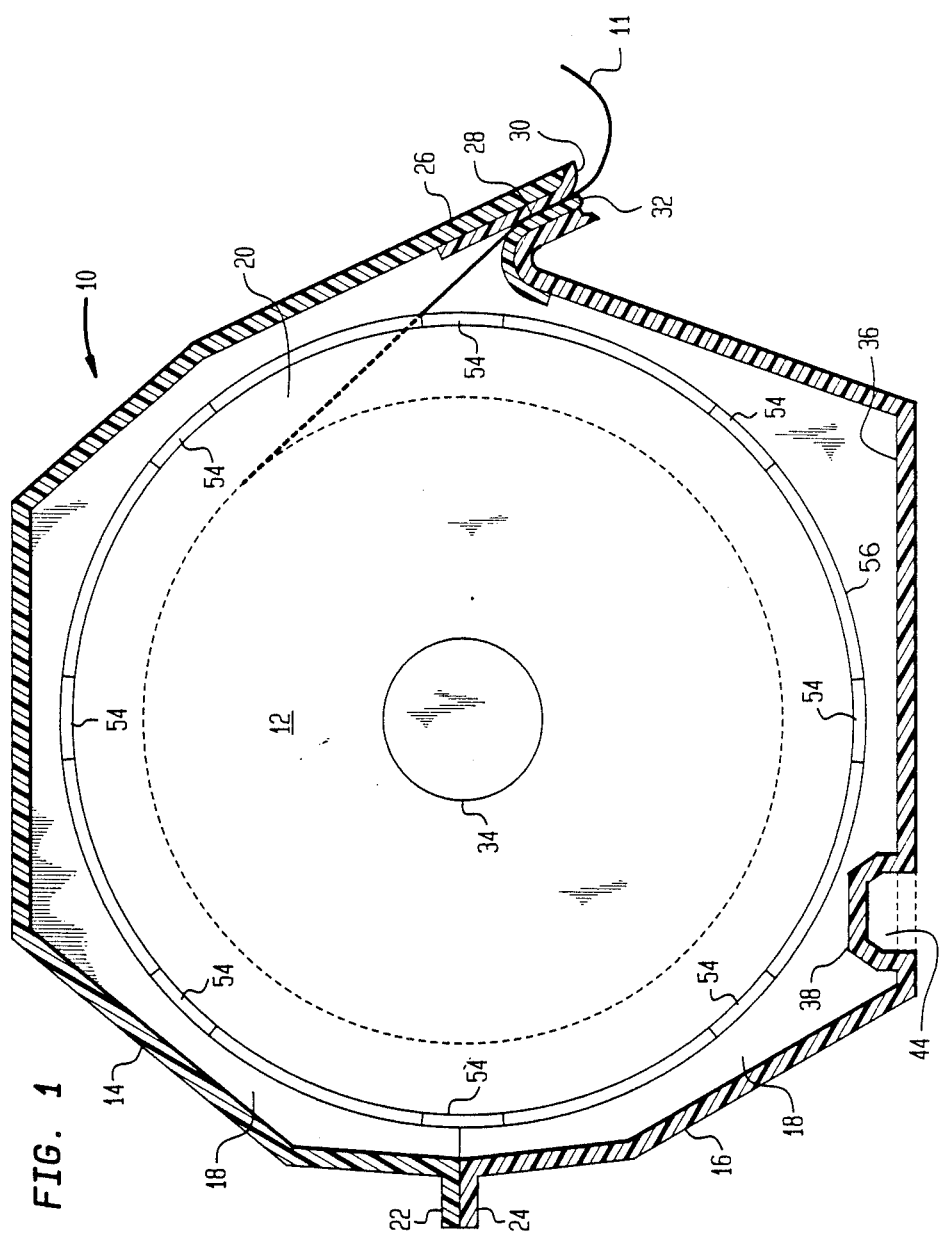
FIG. 1 is a side elevational view, in section, of a cartridge and web-roll of the type in which a preferred embodiment of an optical-mechanical rotation sensing mechanism of this invention is embodied.
Figure 2:
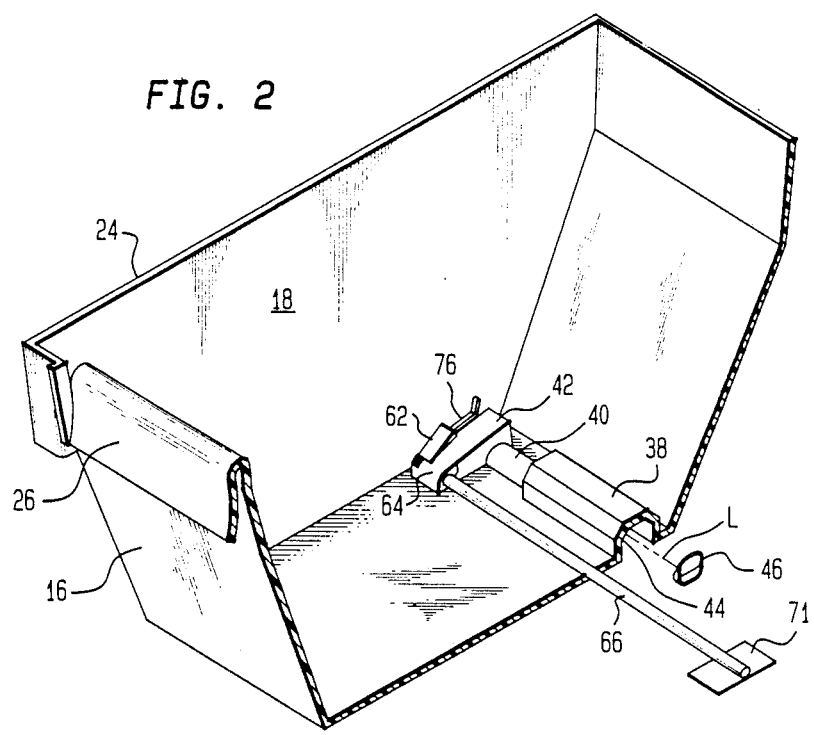
FIG. 2 is a perspective view of a portion of the lower cartridge housing with the web-roll removed for showing portions of the optical-mechanical rotation sensing mechanism.

Illustrated in FIGS. 1 and 2 is a cartridge 10 of the type suitable for supplying a computer output microfilmer or the like, not shown, with long web-rolls 12 of web material 11, such as 105 mm-wide film. The cartridge 10 typically comprises a pair of cartridge housings 14, 16 having side walls 18, one of which is clearly seen in FIG. 2, provided with matching semi-circular journals, not shown, for rotatably supporting cylindrical bearings, not shown, on a pair of identical flanges 20 of the web-roll, only one of which is shown in part. The cartridge housings 14, 16 are sealed together along mating rims 22, 24 for enclosing the web-roll 12. Housings 14, 16 define a nose portion 26 provided with an exit slot 28 through which the web 11 is withdrawn from the cartridge. The nose portion 26 has opposed inner surfaces defining the exit slot 28 to which plush or foam material strips 30, 32 are applied to prevent light from entering the cartridge interior.

The web-roll 12 comprises a web-spool onto which the long web 11 of film or paper is wound. The web-spool comprises a cylindrical core 34 (FIG. 1) having core ends, not shown, to which the pair of flanges 20 are attached or secured. Generally, for the type of cartridge described in reference to this invention, the web 11 is initially wound onto the core 34, the flanges 20 are attached to the core ends to form a web-roll 12, the web-roll is placed in one of the cartridge housings 14, 16, and the other cartridge housing is secured to the one housing for enclosing the web-roll.

Figure 3:
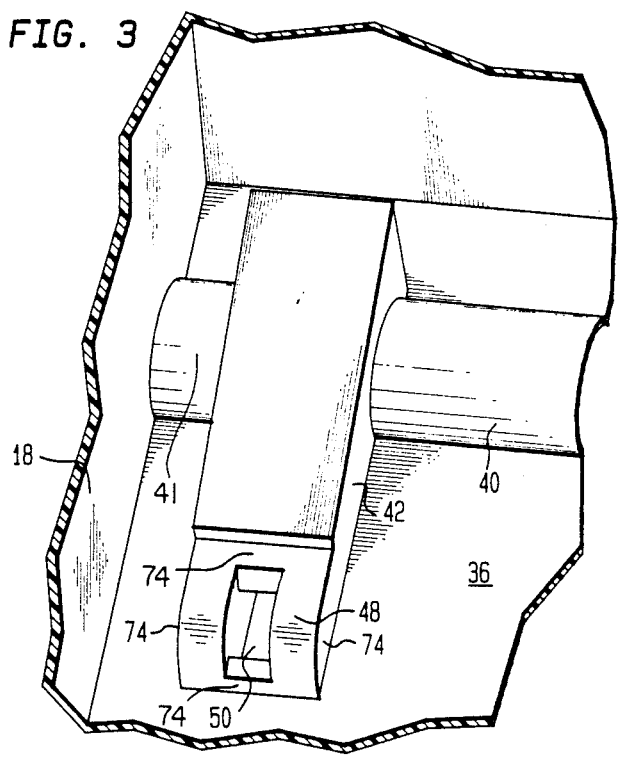
FIG. 3 is a segmental enlarged portion of the cartridge housing of FIG. 2 for supporting the optical-mechanical sensing mechanism.
Figure 4:
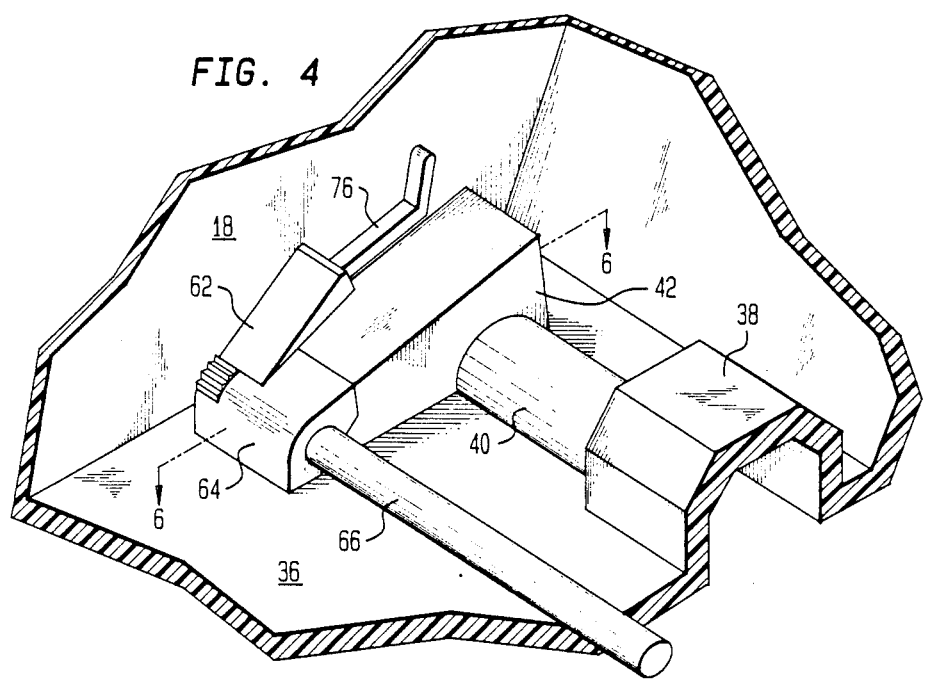
FIG. 4 is an enlarged segmental perspective view similar to FIG. 2.

With reference to FIGS. 2-4, the cartridge housing structure for supporting and accommodating the optical-mechanical rotation sensing mechanism of this invention will be described. Extending upwardly from the inner surface of the cartridge floor 36 are aligned interconnected projections comprising a roof-shaped projection 38, semi-cylindrical projections 40, 41, and a generally trapezoidal box-shaped projection 42. The projections form an integral cavity 44 on the outer surface of the cartridge floor 36 within which is situated a spaced light source and photodetector pair 46 or the like, only one of which is schematically shown in FIG. 2, for projecting a beam of light "L" therebetween. The other of said pair of elements is situated outside of, and adjacent to, cartridge wall 18. The box-shaped projection 42 (FIG. 3) further has a boss 48 at one end having a rectangular opening 50 extending therethrough into the cavity 44 for a purpose to be explained hereinafter.

Referring to FIGS. 2 and 4-7, the mechanical mechanism for coupling the flange activating means to a flag 52 will be described in detail. The flange activating means comprises angularly spaced notches 54 on peripheral lip 56 of the flange. A flag support portion comprises an arm 58 having one end thereof secured to the flag 52 and its opposite end secured to a rib 60. The flag 52 is movable between a first position, in which the beam of light "L" is interrupted, and a second position in which the beam of light is uninterrupted. The coupling means for coupling the notches 54 to the flag 52 comprises a unitary member having a flange lip follower or ramp 62 at one end thereof, a light-shield hood 64 integrally connected thereto, and a torsion spring bar 66 having one end integral with the light-shield hood 64 and its opposite end 71 secured by any suitable means to the inner surface of the cartridge floor 36. The rib 60 of the flag support portion is integral with the undersurface of the light-shield hood 64. In FIGS. 2 and 4, the torsion spring bar 66 biases the flange lip follower ramp 62 and flag support arm 58 and rib 60 in a counterclockwise direction.

Figure 5:
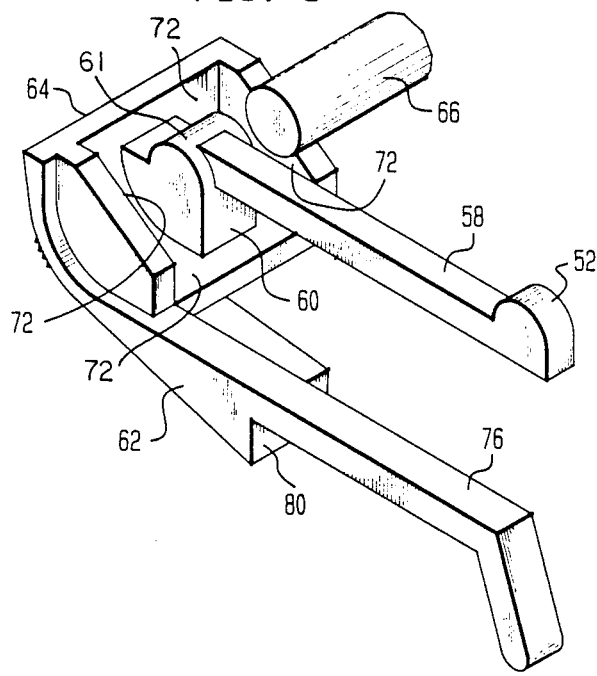
FIG. 5 is a segmental enlarged rear perspective view of the flange follower, flag, and means for coupling the flange follower to the flag.

With reference to FIGS. 3-5, the coupling means is mounted on the floor 36 of the cartridge by initially rotating the coupling means and flag support portion of FIG. 5 in a clockwise direction through approximately 120° and inserting the flag 52, flag support arm 58, and rib 60 through the cartridge floor opening 50 until the rib 60 at one end of the flag support arm nests within the opening with the rib integral bearing surface 61 rotatably supported by rib bearing support surface 73. The opposite end 71 of the torsion bar 66 is then secured by any suitable means to the inner floor surface 36 of the cartridge. In this mounted position (FIGS. 2 and 4), the inner surfaces 72 of the light-shield hood 64 overlap outer surfaces 74 of the boss 48 to provide light integrity so that no light from the environment or beam "L" will penetrate into the interior of the cartridge 10. The flange follower 62 further has an integral leg 76 extending outwardly therefrom, as best seen in FIG. 5, having an end thereof which is engageable with the outer surface of the circular lip 56 on the flange 20 to limit the counterclockwise movement (as viewed in FIG. 4) of the flange follower ramp 62, and thereby control the depth of penetration of the flange follower ramp into the notches 54.

Figure 6:
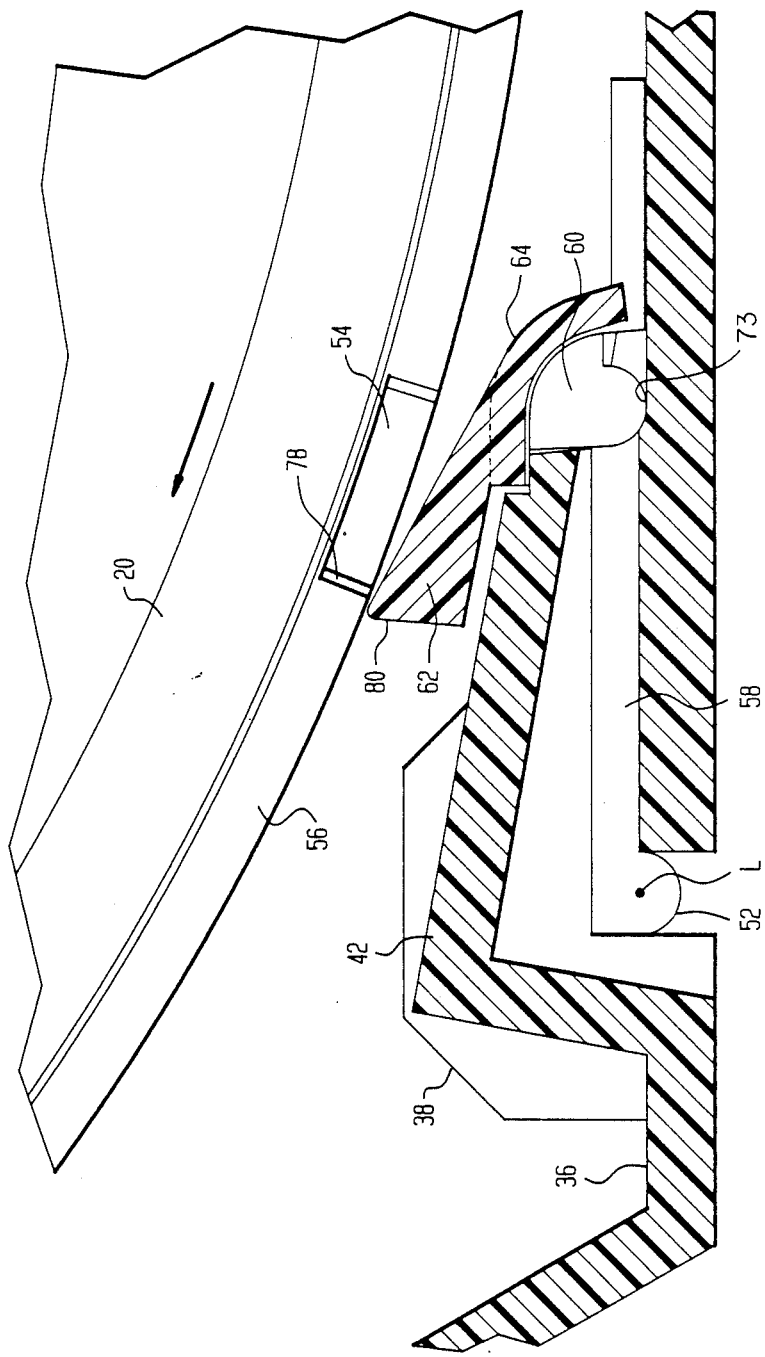
FIG. 6 is an enlarged sectional view, taken substantially along line 6—6 of FIG. 4, showing the flag in its first position.
Figure 7:
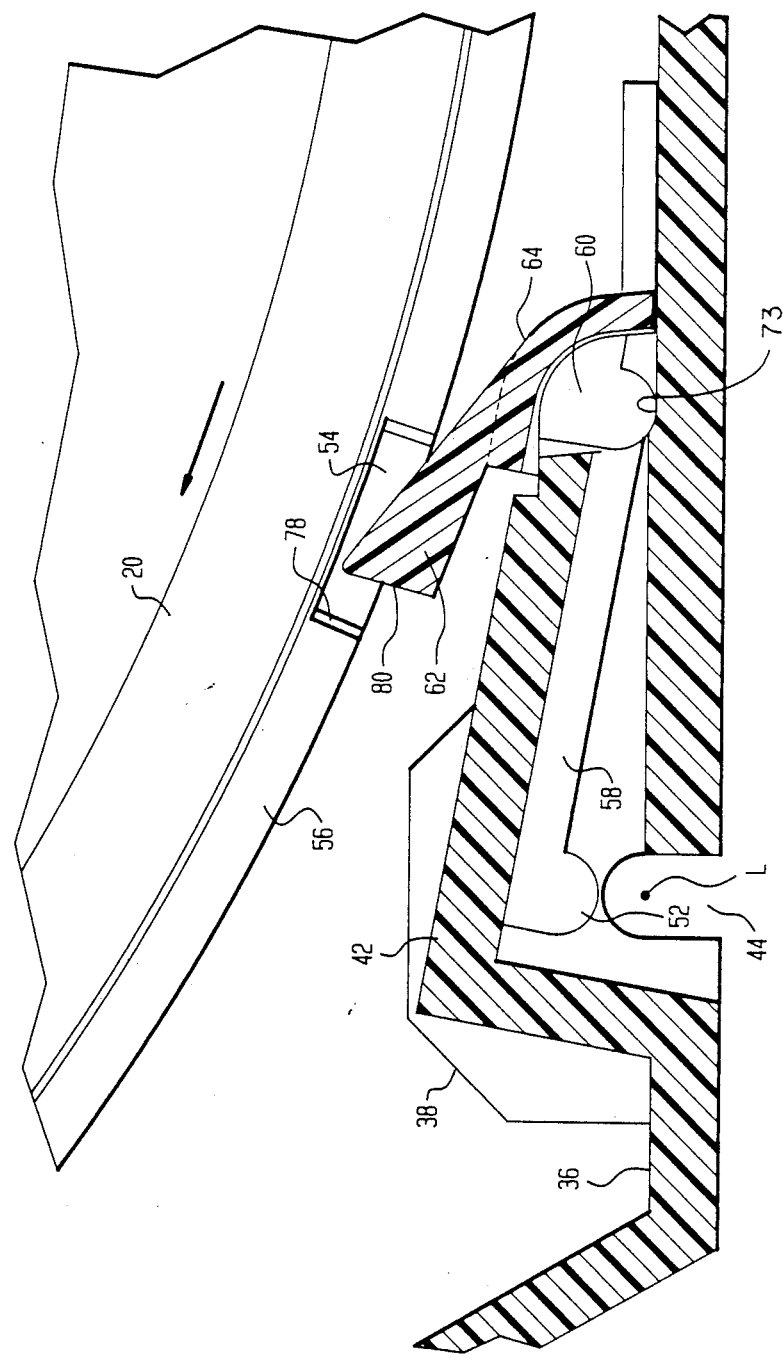
FIG. 7 is an enlarged sectional view, similar to FIG. 6, showing the flag in its second position.

With reference to FIGS. 6 and 7, the operation of the optical-mechanical rotation sensing mechanism will now be described. Let us assume that a cartridge 10 containing a web-roll 12 is mounted in an interfacing mechanism such as a printer, not shown. Let us further assume that a printer web accumulator, not shown, is running low and that it actuates a photocell, not shown, which in turn actuates a stepping motor, not shown, for advancing a fixed length of web from the web-roll. As the web is advanced, the flange 20 rotates with the lip follower ramp 62 in engagement with the lip 56, as best seen in FIG. 6. During this period, the flag 52 is in a position intercepting or interrupting the beam of light "L" in the cartridge cavity 44. When the web is advanced sufficiently to cause the lip follower ramp 62, under the bias of the torsion bar 66, to enter a notch 54, as seen in FIG. 7, the flag 52 is lifted out of the path of the light beam "L", which is now uninterrupted. When this occurs, the photodetector 46 will change its output-signal level, which is fed to a microprocessor. A comparison of photodetector output-signal-level changes so caused by rotation of web-roll 12, on one hand, with stepping-motor pulses, on the other hand, may then be used to determine the quantity of web 11 remaining on the web-roll. A further benefit of this rotation sensing mechanism results when the lip follower ramp 62 enters a notch 54, since any attempt to reverse the rotation of web-roll 12, which might inadvertently retract the web 11 into the cartridge, is prevented by the leading edge 78 of the notch engaging a shoulder 80 on the lip follower ramp 62.

The invention has been described in detail with particular reference to a preferred embodiment thereof, but it will be understood that variations and modifications can be effected within the spirit and scope of the invention.

I claim:

1. An optical-mechanical rotation sensing mechanism for a photosensitive web-roll mounted for rotation within a cartridge, comprising:
   a flange on the web-roll;
   activating means on the flange;
   optical sensing means disposed outside the cartridge and including a beam of light for sensing incremental rotation of the flange and web-roll;
   a flag movably mounted on the cartridge for actuating the sensing means in response to movement of the flag between a first position, in which the beam of light is interrupted, and a second position, in which the beam of light is uninterrupted; and coupling means on the cartridge for coupling the flange activating means to the flag for intermittently moving the flag between its first and second positions.

2. An optical-mechanical rotation sensing mechanism according to claim 1 wherein the flange has a circular lip, and wherein the coupling means comprises a unitary member having a flange lip follower and a flag support portion connected to the flag.

3. An optical-mechanical rotation sensing mechanism according to claim 2 wherein the flange lip follower is pivotably movable within the cartridge, wherein the unitary member further has a spring for biasing the flange lip follower toward the flange lip and the flag toward its second position, wherein the flag support portion and flag extend through an opening in a wall of the cartridge, and wherein the unitary member further has a light-shield hood for light-shielding the cartridge interior from the flag support portion and the opening.

4. An optical-mechanical rotation sensing mechanism according to claim 3 wherein the spring comprises a torsion bar having one end connected to the cartridge and its opposite end connected to the light-shield hood.

5. An optical-mechanical rotation sensing mechanism according to claim 4 wherein the flag support portion comprises a rib secured to the light-shield hood and an arm connecting the rib to the flag, wherein the cartridge has a wall having a projecting boss, wherein the opening extends through the boss and wall for receiving the rib, which nests rotatably therein, and wherein the light-shield hood is a cup-shaped hood enclosing the opening and boss.

6. An optical-mechanical rotation sensing mechanism according to claim 5 wherein the light-shield cup-shaped hood has inner surfaces overlapping outer surfaces of the boss.

7. An optical-mechanical rotation sensing mechanism according to claim 6 wherein the activating means comprises angularly spaced notches in the circular flange lip, and wherein the flange lip follower comprises a ramp disposed for alignment with the notches.

8. An optical-mechanical rotation sensing mechanism according to claim 7 wherein the flange lip follower ramp has an inclined surface terminating in a shoulder and disposed for engagement with the flange lip; wherein, in a forward direction of rotation of the web-roll corresponding to withdrawal of web material thereon from the cartridge, the follower ramp rides on the flange lip, successively enters the notches therein, and is cammed out of each entered notch by an edge thereof riding on the ramp inclined surface; and wherein, in a reverse direction of rotation of the web-roll corresponding to retraction of withdrawn web material, an opposing edge of an entered notch engages the ramp shoulder to prevent further rotation of the web-roll in the reverse direction.

* * * * *